July 20, 1943.  A. KALIN  2,324,514
GOVERNOR
Filed March 26, 1941  5 Sheets-Sheet 1

FIG-1

INVENTOR.
ALBERT KALIN
BY
ATT'Y

July 20, 1943.  A. KALIN  2,324,514
GOVERNOR
Filed March 26, 1941  5 Sheets-Sheet 3

INVENTOR.
ALBERT KALIN
BY George M. Soule
ATT'Y

July 20, 1943.                A. KALIN                    2,324,514
                              GOVERNOR
                    Filed March 26, 1941          5 Sheets-Sheet 4

INVENTOR.
ALBERT KALIN
BY George M. Soule
ATT'Y

Patented July 20, 1943

2,324,514

UNITED STATES PATENT OFFICE 2,324,514

GOVERNOR

Albert Kalin, Cleveland, Ohio

Application March 26, 1941, Serial No. 385,228

5 Claims. (Cl. 121—42)

This invention relates to a governor for regulating the operation of controllable apparatus and machinery in accordance with changes in conditions of operation thereof. The governor illustrated herewith is adapted for controlling the speed of a prime mover such as a Diesel engine and is of the type shown in my Patent 2,219,229, issued October 22, 1940.

The objects include the provision of new or improved governor mechanism or apparatus for:
1. Securing generally improved governor operation;
2. Completely or partially shutting down the governed apparatus or machine at desired times;
  (a) without having to disturb the adjustment of the weighing (e. g. speed weighing) mechanism of the governor;
  (b) incident to a predetermined adjustment of the weighing mechanism (as when a speed adjustment mechanism is moved to or below lowest running speed);
  (c) selectively, as by hand, suitable remotely-controllable motor or automatically operating mechanism independently of the usual adjustment mechanism.
3. Reducing or cutting off power input to a governed prime mover through means acting hydraulically on a main control valve of a speed governor incorporating a hydraulically actuated, speed-regulating servo-motor.

Other objects will be brought out in the following description relating to the accompanying drawings, in which.

The invention will be described only as adapted to regulate speed of a prime mover, but without intent to limit the invention to that use. The governor may be made responsive to any force resultant other than speed, as well known in the art.

GENERAL ARRANGEMENT

Figure 1:
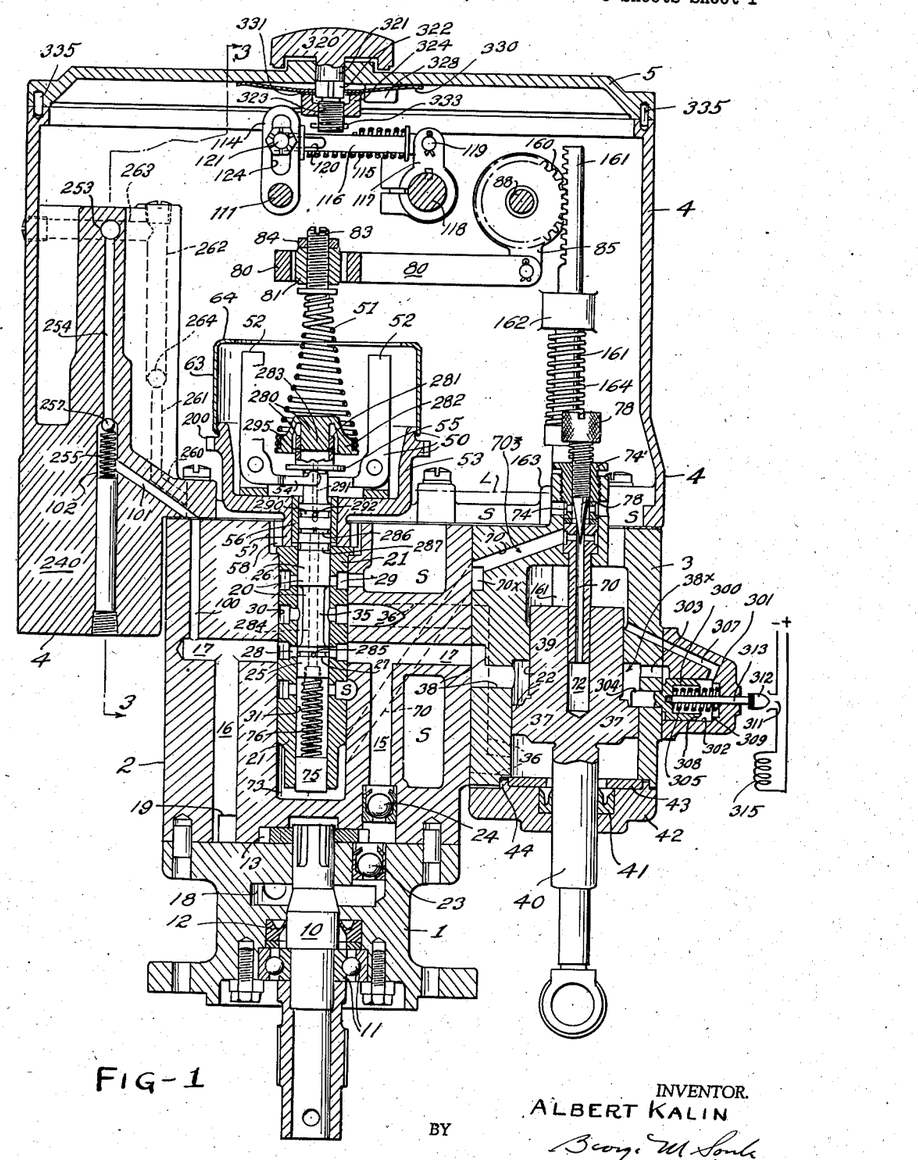
Fig. 1 is a main central vertical sectional view of the governor.

Referring particularly to Fig. 1, 1 is a base or adapter by which the governor is mounted as on a prime mover to be governed; 2 a power case surmounting the base; 3 a main servo-motor cylinder block adjacent one side of the power case; 4 a speeder case surmounting the power case and servo-motor block, and 5 a detachable cover for the speeder case. The above parts are preferably metal castings, machined, fitted and secured together in fluid tight relationship. The means for attaching the cover plate to the speeder case (new feature) will be fully described later.

For coupling the governor to a rotary part of a machine to be governed (e. g. a Diesel engine) a shaft 10 extends through the base 1, supported mainly by a bearing assembly 11, above which an oil seal device 12 peripherally embraces the shaft to prevent passage of the hydraulic fluid from the interior of the base downwardly along the shaft.

Figures 3, 4, 5, 6:
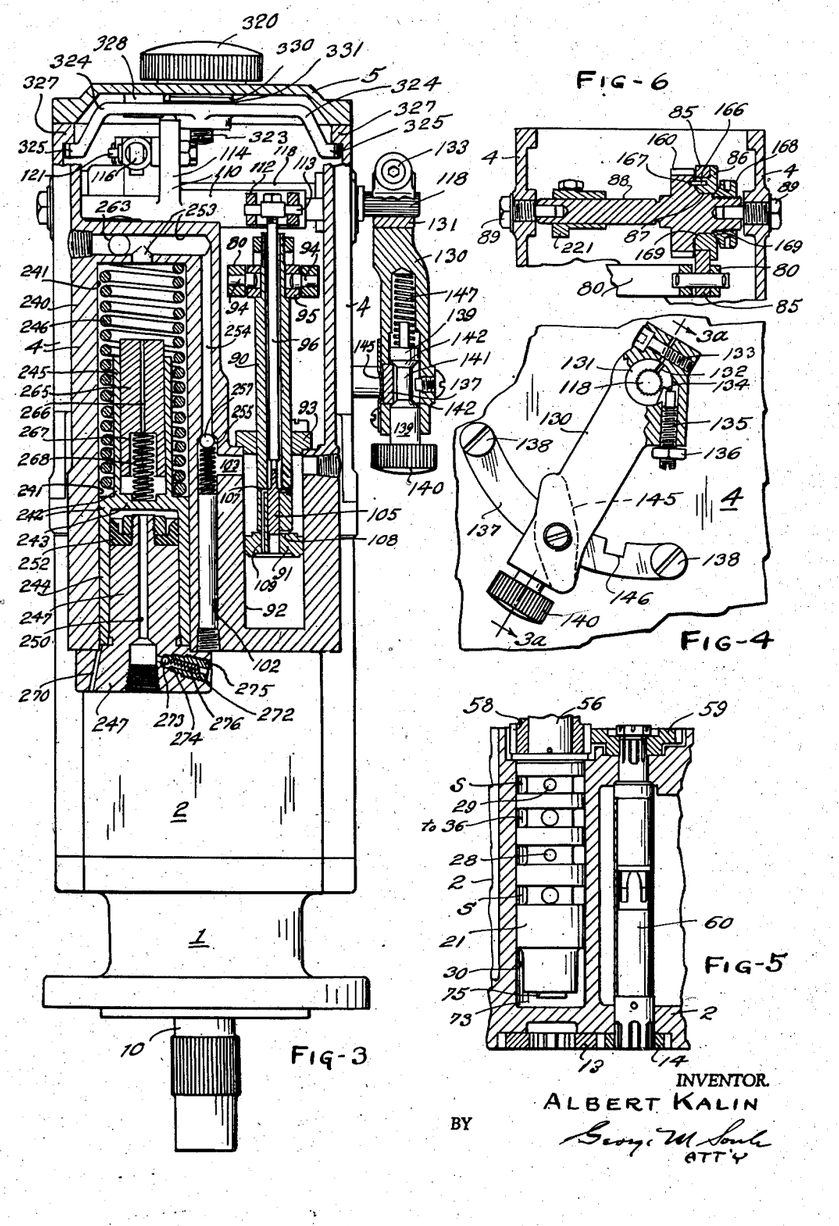
Fig. 3 is a vertical sectional view taken principally along the lines 3—3 on Figs. 1 and 2, and partially as at 3a—3a Fig. 4.
Fig. 4 is a fragmentary side view of the governor (partly in section) showing a manually adjustable speed setting arm device.
Fig. 5 is a sectional detail showing a ball-head drive mechanism, taken as indicated at 5—5 Fig. 2.

The upper end of the shaft 10 has, drivingly rigid therewith, one gear element 13 of a gear pump. The cooperating gear element 14 is shown in Fig. 5. The gear pump operates continuously, during rotation of the shaft 10, and cooperates with spring loaded accumulators (not shown) to maintain operating fluid at constant pressure in a system of ducts including bores 15, 16 and 17 in the power case. Hydraulic fluid supplied to and maintained at the bore 17 under constant pressure is controlled by operation of a pilot valve (plunger 20, sleeve 21 and other elements to be described later) to effect movement of a servomotor piston 22 in the proper direction to regulate the speed of the engine and to perform other operations as will hereinafter appear. Fluid is supplied to the pump from a supply sump S partly in the power case and partly in the speeder case, essentially in the manner shown and described in the patent identified above (Figs. 1, 2 and 4 thereof). Normal fluid level is indicated at L herein. The supply inlet of the pump (space 18, lower part of Fig. 1) communicates with the power case portion of the sump; and inlet and outlet valves, one inlet valve element of one cooperating pair of inlet and outlet valves being shown at 23 and one outlet valve element of another co-operating pair being shown at 24, cooperate as usual with the pump gears, pump chambers and inlet and outlet ducts. The spring-loaded accumulators may be located in the power case at opposite sides of the bore 16 and communicate with said bore as through cross channels in the under side of the power case. One such channel is indicated at 19 (lower left, Fig. 1). The accumulators maintain uniform pressure in the ducts 15, 16 and 17 in the event of overdelivery by the pump, excess fluid being discharged to the sump essentially as in the arrangement shown in said patent.

The pilot valve sleeve 21 is tightly fitted into a central vertical cylindrical bore 30 in a central portion of the power case which completely surrounds the valve sleeve. The valve sleeve has a cylindrical axial bore 31 which is open at both ends of the sleeve and in which various "land" portions of the pilot valve plunger are slidably fitted and enabled to rotate while maintaining respective lateral ports of the sleeve sealed, as will be apparent. The plunger has two main lands 25 and 26. The lower land is separated into upper and lower land portions by a groove 27 but the complete land 25 normally seals ports 28 of the pilot valve sleeve (open to constant pressure at the bore 17) with reference to the central bore of said sleeve. The upper land 26 normally seals ports 29 of the pilot valve sleeve (open to the sump) against communication with the central bore of the sleeve. A neck portion 35 of the pilot valve plunger maintains an open space between the valve plunger and valve sleeve which communicates at all times with a duct 36 which, in turn, communicates freely with the lower end portion of the servo-motor cylinder, i. e. below the enlarged portion 37 of the servo-motor piston 22. The ports 28 of the sleeve which are normally blocked by the land 25 communicate freely at all times with the servo-motor cylinder above the piston portion 37 through a duct 38. The reduced upper end 39 of the servo-motor piston slidably closes the upper end of the servo-motor cylinder and reduces the effective area of the servo-motor piston relative to the lower effective area of the piston, so that, with the same pressure admitted to the cylinder above and below the piston portion 37, the piston moves upwardly. The piston has a power connection (regulating rod 40) extending downwardly out of the servo-motor cylinder block through a sealing ring 41 in a lower cylinder closure cap 42 secured to the cylinder block around the margin of a copper gasket 43. The gasket is partly contained by a rib 44 on the cap.

Downward movement of the servo-motor piston reduces and eventually cuts off power input to the engine; and upward movement admits and increases such power input.

When the pilot valve plunger 20 is moved downwardly from its normal (illustrated) position, the land 25 opens the ports 28 to the interior of the valve sleeve 21, whereupon constant pressure from the bore 17 around the sleeve is admitted to the duct 36 past the neck 35 of the valve plunger; and the servo-motor piston is raised due to the area differential of said piston.

When the pilot valve plunger is raised, the land 26, by opening the ports 29 to communication with the interior of the valve sleeve 21, dumps operating fluid from the servo-motor cylinder below the piston portion 37 to the sump through the duct 36, valve sleeve bore 31 and ports 29; and constant pressure from the bore 17 through the duct 38 to the upper side of the piston portion 37 then causes lowering of the servo-motor piston.

The pilot valve plunger is maintained in the position shown, holding the servo-motor piston against movement, during normal operation of the engine, by reason of the operation of a flyball mechanism 50 including a speeder spring 51 and fly-balls 52 pivoted on a rotary ball head 53. The fly-ball arms 54 bear upwardly at their inner ends on a thrust member 55 rigid with the pilot valve plunger, tending to raise the plunger as the speed of the engine increases; but, so long as the load on the engine remains constant at a given setting of the speeder spring, the downward force of the spring on the valve plunger holds said plunger against upward movement, in other words in "balanced" position to maintain both lands 25 and 26 in closing relation to their respective ports. Friction of the ball-arm fingers on the thrust member 55 causes the pilot valve plunger to rotate with the ball head during the entire operation of the governor.

The illustrated connection between the speeder spring and pilot valve plunger 20 (new feature) includes a special device for carrying out objects No. 4 (supra) and this will be described later. An antifriction bearing (as in my Patent 2,219,229) may be used instead of said special device.

The ball head 53 is journaled for rotation on a reduced upper end portion 56 of the pilot valve sleeve 21. A depending hub portion 57 of the ball head which surrounds said portion 56 of the valve sleeve has gear teeth 58 and, as shown in Fig. 5, the teeth mesh with a driving gear 59 on a vertical shaft 60 the lower end of which is drivingly rigid with the pump gear 14. The ball head 53 has a circular wall portion 62 around the fly-balls and this supports a sleeve 63 which extends upwardly beyond the ends of the fly-balls and is turned inwardly a slight distance at the top as indicated at 64. The sleeve and rim portion of the ball head act as a centrifuge to clean operating fluid passed through the hydraulic system as fully explained in my said patent.

Isochronous operation of the governor requires primary and secondary compensation, as is well known. The compensation system shown herein is essentially the same as that of the above identified patent and reference is directed to said patent for a more complete discussion of the same than given herein. Primary compensation is effected hydraulically as a function of servo-motor piston movement; and restrains the axial movement of the pilot valve in its operation to initiate movement of the servo-motor piston, thus preventing overtravel of said piston both in reducing and increasing power input to the engine.

For primary compensation, fluid is moved in a compensation fluid duct 70 which extends through various parts essentially the same as in my said patent. A hollow piston 71 fixed to the upper end of the servo-motor block 3 operates in an axial bore 72 of the servo-motor piston 22 so as to serve as an actuating compensation pump in increasing and decreasing pressure at a space 73 below the pilot valve sleeve 21 and within the closed lower end of the bore 30 of the power case. The compensation fluid duct 70 is normally kept full of operating fluid from the sump through lateral holes 74 in a sleeve 75 (above servo-motor) the bore of which sleeve has restricted communication with the compensation duct 70 at the upper end of the hollow piston 71. The holes 74 are open outwardly to the sump in the speeder case.

When load on the engine drops, the fly balls move outwardly, thus raising the pilot valve plunger. As the pilot valve plunger is moved upwardly from its normally centered position, initiating a downward or power input reducing movement of the servo-motor piston, suction on the fluid in the compensation fluid duct 70 tends to evacuate the space 73 below the pilot valve sleeve. This acts, hydraulically, yieldingly to restrain the upward movement of the pilot valve plunger, by virtue of a receiving compensation piston 75 connected to the pilot valve plunger by means of a coil spring 76 capable of imparting reversible restraining action on the plunger and capable of causing the piston 75 to turn with the valve plunger in the valve sleeve. The restraint (primary compensation) is only temporary because, as soon as the servo-motor piston starts to move downwardly, fluid begins to leak into the compensation duct (secondary compensation) from the sump at holes 74 and the restricted communication thereof with the compensation duct. The rate of leakage is regulated by an adjustable needle valve pin 78 between the holes 74 and the compensation duct. The space between the receiving compensation piston 75 and the pilot valve plunger communicates freely with the sump space of the power case.

Upon increase of load, resulting in a lowering movement of the pilot valve plunger, the reverse of the above described action takes place. The resulting upward or power-input-increasing movement of the servo-motor piston moves fluid in the compensation fluid duct 70, raising or tending to raise the receiving compensation piston 75, thereby to restrain the lowering movement of the pilot valve. Secondary compensation (leakage through the restriction at the needle valve 78) removes the restraining action of the compensation piston 75 on the pilot valve plunger as the speed is brought back to normal; but the direction of fluid leakage is reversed. Fluid leaks from duct 70 into the sump.

The above described arrangement in general, i. e., except where attention is called to new features, is the same as that of my Patent 2,219,229, and the operation thus far is also essentially the same as in said patent.

SPEED ADJUSTMENT

Figures 2, 7:
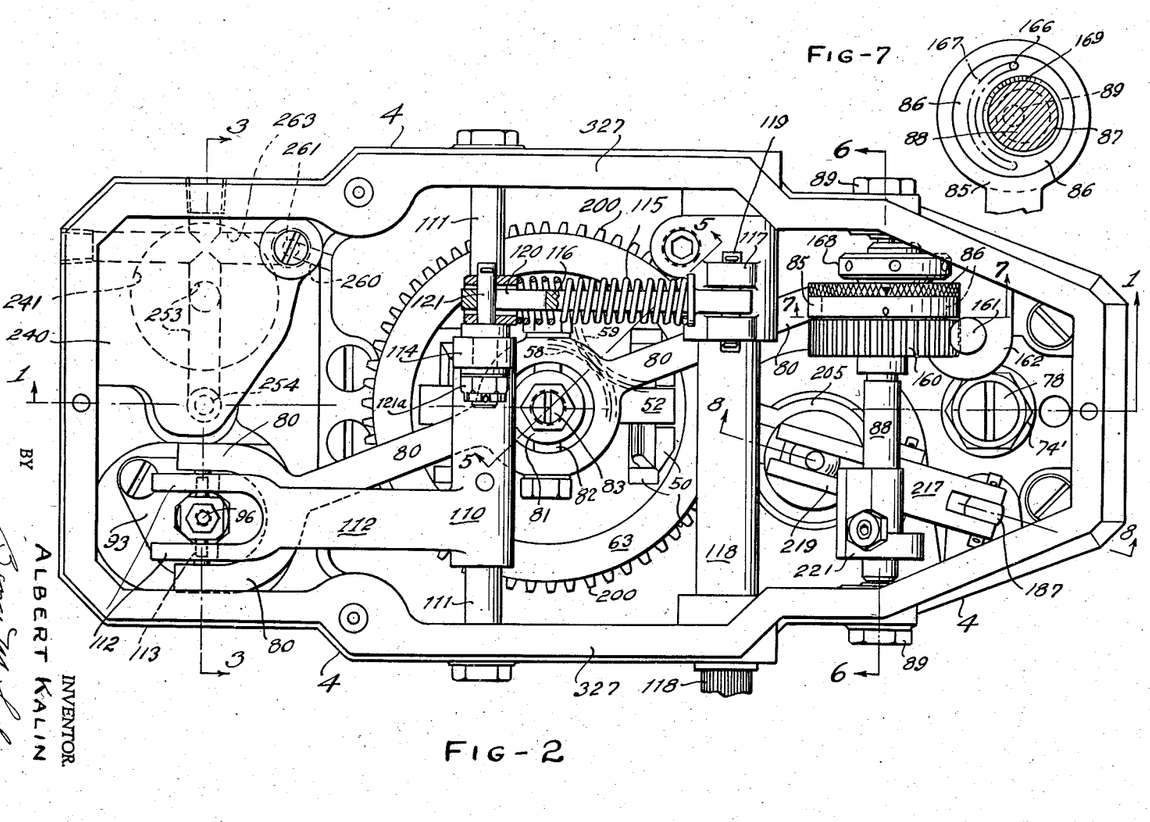
Fig. 2 is relatively enlarged plan view thereof (cover removed), on which the plane of Fig. 1 is indicated at 1—1.
Figs. 6 and 7 are sectional detail views taken as at 6—6 and 7—7 Fig. 2 showing (inter alia) mechanism which adjustably supports one end of a speeder lever.

As shown best by Figs. 1 and 2, a speed control lever 80 extends over the speeder spring 51, (diagonally of the speeder case in a horizontal plane as shown by Fig. 2). The lever has an adjustable trunnion connection with the speeder spring in the form of a block 81 (cylindrical sleeve) pivoted on aligned pins 82 which are carried by spaced portions of the lever, and an adjustable screw 83 in the block which bears downwardly on the speeder spring and may be locked in place in the block as by a nut 84 engaging the block. The normally fixed supporting fulcrum of the lever (right, Fig. 1) is adjustable vertically (for speed droop, more fully explained later), and as shown by Figs. 1, 2, 6 and 7 comprises a strap 85 embracing a circular surface of a ring 86 which, in turn, is carried on an eccentric surface 87 (see Fig. 7, sheet 2 of drawings) of a horizontal pintle shaft 88. The shaft is rotatably supported on aligned pins 89 (Fig. 6) threaded into opposite walls of the speeder case. The relatively eccentric surfaces of the ring 86 and of the shaft 88 (at 87) are so related as to offset each other in one turned position of the ring 86 on the eccentric surface 87 of the shaft (differential eccentrics) so that in such setting (zero speed droop), turning of the shaft will not raise or lower the end of the lever 80 suspended therefrom. In such case the governor operates isochronously regardless of turning of the shaft 88. The remaining elements, constituting the adjustable fulcrum for the speed adjusting lever 80 (speed droop suspension) will be described later under the heading "Speed droop adjustment."

POWER HEAD

As shown in Figs. 2 and 3 the end of the speed adjustment lever 80 opposite the fulcrum (i. e. left end, Fig. 2) is pivoted to an upright stem 90 of a power head piston 91 which operates in a vertical cylinder bore 92 formed in the speeder case, a portion of which latter (240) may extend below the top of the power case as shown in Fig. 1 to accommodate the power head. The stem 90 is slidably guided for vertical movement in a cap 93 closing the upper end of the power head cylinder bore 92. The left hand end of the lever 80 is bifurcated to straddle the stem 90 and is provided with axially aligned horizontal pins 94, the proximate ends of which pivot in a ring 95 clamped to the upper end of the power head piston stem 90.

The power head piston is actuated hydraulically and is controlled by a follow-up valve the stem of which is shown at 96 within an axial bore of the piston stem 90, so that the piston moves up and down with the valve, i. e. as the valve stem is moved up and down. The valve admits fluid from a constant pressure source (described later) into operative relation to the piston for movement of the latter up and down exactly as the valve stem 96 is moved. The valve requires very little power to operate it, and thus the power required for changing speed, manually or by a Selsyn motor, may be made independent of the variable resistance of the speeder spring in opposing speed adjustment. The available hydraulic power from the constant pressure source is always more than adequate to overcome the force of the speeder spring at any degree of compression thereof. Thus the power head is useful: (a) in preventing lag on part of (e. g.) a Selsyn motor due to resistance by the speeder spring, and (b) in preventing the speeder spring from disturbing manually adjusted speed setting.

Constant pressure is applied to the upper side of the power head piston 91 (Fig. 3), to move the piston downwardly, through a duct comprising a vertical bore 100 (left Fig. 1) in the power case communicating with the bore 17 thereof, and bores in the speeder case comprising a diagonal bore 101, vertical bore 102 and a horizontal bore 103. The latter is shown in Fig. 3 connecting the upper end of the power head cylinder 92 with the vertical bore 102. The same pressure is applied to the lower piston face (larger) to move the piston upwardly as will be shown presently.

The power head valve is a cylindrical plug 105 on the lower end of the valve stem 96, which latter does not seal the bore 97 of the piston stem above the plug, whereas the plug is in sealing relation to the portion of the bore in which it slides. The plug 105 normally blocks two lateral ports 107 and 108 in the stem of the power head piston 91. The port 107 communicates freely with the power head cylinder below the piston 91 through a duct 109; and the port 108 communicates directly with the effectively smaller cylinder above the piston 91. When the plug 105 is moved downwardly by the speed setting mechanism, fluid from the cylinder 92 below the piston 91 is vented to atmosphere along the valve stem 96, i. e. between it and the piston stem 90, whereupon pressure applied above the piston (smaller effective area) moves the piston downwardly until the plug again blocks the port 107. Similarly when the plug 105 is raised it unblocks the port 108 admitting constant pressure to the lower end of the power head cylinder 92, thus raising the piston to whatever extent the plug 105 has been raised and then blocking the port 108, stopping further upward travel of the piston.

While hydraulic fluid is being admitted to the lower side of the power head piston 91 there is a tendency for fluid, so admitted, to raise the follow-up valve plug 105 against the restraining influence of the speed setting mechanism thereon through the stem 96. The force thus temporarily exerted on the relatively small plug during speed adjustment is too small to be of any consequence, and as soon as the power head piston rises and closes the port 108 the tendency to force the plug upwardly ceases.

Power head operating mechanism

For operating the power head valve stem 96 there is provided, as shown in Figs. 2 and 3, a bell crank 110 pivotally supported on a horizontal shaft 111 in the speeder case. The bell crank has a horizontally extending bifurcated arm 112 provided with a pin and slot connection 113 with the upper end of the said valve stem. An upstanding arm 114 of the bell crank has a yielding lost motion connection (compressible link, including a spring 115 and bar 116) with an arm 117, which latter is keyed to a speed adjustment shaft 118 suitably mounted in the speeder case parallel to the shaft 111 and at the right thereof (Figs. 1 and 2). One end of the shaft 118 (or both ends if desired) can extend out of the case for connection with a primary adjustment device or mechanism. One end only, as shown, is so extended, as to the right of the speeder case in Fig. 3. The bar 116 is pivotally pinned to the arm 117 at 119 and has a slot 120 slidably embracing a pin 121 on the bell crank arm 114.

For increased speed adjustment the shaft 118 is rotated counterclockwise as viewed in Figs. 1 and 4; and by virtue the yielding lost motion connection constituted by the spring 115, slot 120 and pin 121 the shaft 118 cannot, upon turning of the shaft to increase speed, as at starting of governor operation, be moved so forcibly as to strain or break the arms 112, 114 or 117. The danger of such breakage occurring arises from the fact that, until operating fluid pressure is built up in the hydraulic system by the gear pump or otherwise, the power head piston is "oil-locked" against downward movement.

It is usually desirable to move the speed adjusting lever 80 through a definite angle in adjusting speed from maximum speed setting to minimum speed setting. The manual adjustment quadrant may, for instance, be limited to a 40° turn whereas a 42° or a 38° turn of the bell crank 110 may be necessary to adjust the speeder spring from the lowest desired speed setting to the highest desired setting. To enable the relationship between turning of the shaft 118 and adjustment of the speeder lever 80 to be changed, a slot 124 (Fig. 1) is provided in the upstanding arm 114 of the bell crank 110, and the pin 121 can be locked in various positions along the arm 114 thus changing the angle through which the bell crank (and consequently the lever 80) will swing with a given angular movement of the adjusting shaft 118. The pin 121 has a clamping nut 121a which is readily accessible through the top of the speeder case.

If speed adjustment is to be effected from a remote point, as by a Selsyn motor, a suitable gear sector (not shown) is secured to the outward end of the shaft 118, which in that event may be made larger than as shown, and the sector meshes with the driving gear of the Selsyn motor. The power head then enables adjustment by such motor without introducing vagaries due to motor lag in proportion to the increased force required for increasing speed (compressing the speeder spring.) If speed adjustment is manually effected the operator cannot, by virtue of the yielding connection described above, break any part of the mechanism by trying to force increased speed adjustment. Upon turning of the shaft in a direction to decrease speed (lifting the follow-up valve stem) there is no danger of breaking any part of the mechanism because the upward movement of the plug is never restrained by trapped hydraulic fluid. The hand lever quadrant is always so arranged as to limit upward movement of the valve operating arm 112 to an angle less than would be required to cause said arm to engage the speeder case cover.

Manual speed adjustment. Positive lock

Figs. 3 and 4 show the preferred arrangement for adjusting speed manually.

One end of the shaft 118 is provided with a convenient number of parallel serrations spaced a few degrees apart so that a complementarily serrated member such as an adjusting arm can have a number of angularly turned positions thereon closely spaced apart for any given setting of the speed adjustment mechanism. The arm 130 carries a bushing 131, slit at 132, which bushing can be turned in the arm and clamped thereto as by a cap screw 133. The bushing is serrated to fit the serrations on the shaft 118 and notched to provide a radial shoulder 134. The arm carries a screw 135 in such position that its inner end can bear on the shoulder 134 tangentially of the bushing, and the screw 135 has a lock nut 136.

Near the free end of the arm 130 the same is recessed toward the speeder case (Fig. 3) to receive a quadrant bar 137 secured at its ends to the speeder case, as by screws 138 (Fig. 4), so that the arm can travel along the bar between the limits provided by the heads of the screws 138. A spring plate 145 bridges the recess and is bowed between its ends so as to press frictionally on the quadrant bar. The arm 130 is bored lengthwise to receive a rotary plunger 139 fitted to the bore and having a knurled knob 140 at its outer end by which the plunger can be manipulated. The plunger has a reduced neck 141 slightly shorter than the width of the quadrant bar in a direction lengthwise of the arm 130 and conical shoulders 142 adjacent the neck which bear on respective outer corners of the quadrant bar. The conical shoulders serve as friction driving surfaces when the plunger is turned by means of the knob, thus to move the arm along the bar. The spring plate 145 serves to maintain driving contact between the conical shoulders 142 and the quadrant bar. The quadrant bar has a notch 146 (Fig. 4 only) so positioned that, when the arm 130 is swung in a counterclockwise (speed increasing) direction nearly to the limit of its movement in that direction along the quadrant bar, the plunger can be moved outwardly (pressed out by spring 147) so as positively to lock the adjusting arm to the quadrant bar. The inner relatively enlarged end of the plunger engages the notch as will be apparent.

With the above arrangement, in order to position the arm 130 so that, in the locked position of it (plunger engaging notch 146), the engine operates at normal speed under normal load, one proceeds as follows: The bushing 131 is released by the clamping screw 133 and the screw 135 backed away from the shoulder 134. The arm 130 is then moved to locked position (plunger 139 engaging the notch 146). The bushing is then set to the nearest serrations so that it is approximately in the position shown in Fig. 4 when the engine will run or is running slightly under normal speed in the locked position of the arm. One obtains approximately these relationships by operating the speeder mechanism through the top of the speeder case. Next, with the engine running, the bushing 131 is turned by means of the screw 135 against the shoulder 134 until normal speed is reached. Finally the bushing is clamped solidly to the adjusting arm by means of the screw 133.

For changing speed, one has only to push the plunger knob 140 toward the adjusting arm (releasing plunger 139 from notch 146) and to turn the knob in the proper direction to drive the arm along the quadrant bar. The friction of the plunger in its bore, the force of the spring 147 on the plunger and the friction of the spring 145 against the quadrant bar cooperate to hold the arm in adjusted position. Nevertheless it is an easy matter for the operator to overcome all the friction when turning the knob.

Speed Droop Adjustment
*(Continued in part)*

Speed droop operation of the governor is accomplished by gradually reducing the downward force of the speeder spring on the pilot valve as the load on the engine is increased and the servo-motor piston operates in the direction to increase power input to the engine. The result of reduction of downward pressure on the speeder spring by the speed adjustment lever 80 incident to such operation of the servo-motor is to accelerate the operation of the fly-balls in returning the pilot valve to normal position following increase in load. Thereby the speed of the engine is not returned to normal (as in isochronous operation of the governor) but is depressed an amount determined by the slacking off of effective speeder spring pressure. Accordingly the shaft 88 which supports the fulcrum strap 85 of the differential eccentric 86, 87 is rotated incident to upward movement of the speed regulating servo-motor piston 22 in a manner to lift the right hand end of the lever through operation of the eccentric mechanism. The operating connection between the servo-motor piston 22 and the shaft 88 (Figs. 1 and 2) is a pinion 160 on the shaft 88 and rack teeth on a rod 161 in mesh therewith. The rod, in effect, is a tail-rod for the servo-motor piston. The tail-rod may be slidably supported by vertically spaced fixed ear formations 162 and 163 of the speeder case; and the lower end of the tail-rod is maintained in contact with the piston 22 by a follow-up spring 164 bearing downwardly on the tail-rod at an abutment 165 thereof and reacting upwardly against the ear 162.

Referring further to the double eccentric mechanism, Figs. 6 and 7, the ring 86 bears against one side of the pinion 160 and has a pin 166 extending therefrom into an arcuate slot 167 in the pinion which is concentric with the relatively eccentric surface 87 of the shaft 88. One end of the slot, in event negative speed droop is not required, abuts the pin when the ring 86 is set for zero speed droop (as in Fig. 7). The slot extends around the pinion a sufficient distance so that the ring can be adjusted for the maximum desired percentage of speed droop as can be delineated by graduations on the top face of the strap 85 and a coacting indicator point on the ring 86. When the ring 86 has been adjusted for the desired percentage of speed droop it is locked in place by a nut 168 threaded on the shaft 88 in position to abut the ring and force it against the pinion. The shaft and nut, as shown in Fig. 6, have opposed conical surfaces coacting with complementary conical surfaces 169 of the ring 86, so that the ring and eccentric surface 87 can have adequate clearance for permitting the ring to be turned easily by hand when the nut is released, yet be maintained in absolutely concentric relation when the ring is locked by the nut.

The percentage of speed droop indicated on the dial (face of strap 85) has to be recalibrated for different normal speed settings; since (e. g.) a 5% speed droop at one normal speed becomes a higher percentage of any lower speed.

Hydraulic Shutdown

With the prime mover running steadily at normal speed the upward force on the pilot valve plunger 20 by the fly-ball mechanism is balanced by the downward force of the speeder spring. Also, during such operation the fluid in the compensation fluid duct 70 is under negligible (sump head) pressure. To decrease engine speed at desired times or under certain critical conditions without changing the speed adjustment mechanism, I arrange to operate the pilot valve by hydraulic means in the necessary direction to cause shutting down or slowing down of the prime mover through the speed regulating servo-motor.

In the governor illustrated, I provide for admitting fluid from a constant pressure source (i. e. accumulator pressure) into the compensation duct, which force is sufficient at any time, if continued, to force the pilot valve plunger upwardly through the intermediary of the receiving compensation piston 75 and spring 76 to shut down the prime mover. Any other source of pressure, if sufficiently high, can be utilized in the manner indicated to accomplish shutdown or reduction of power input without changing the speed setting of the governor.

Figure 8:
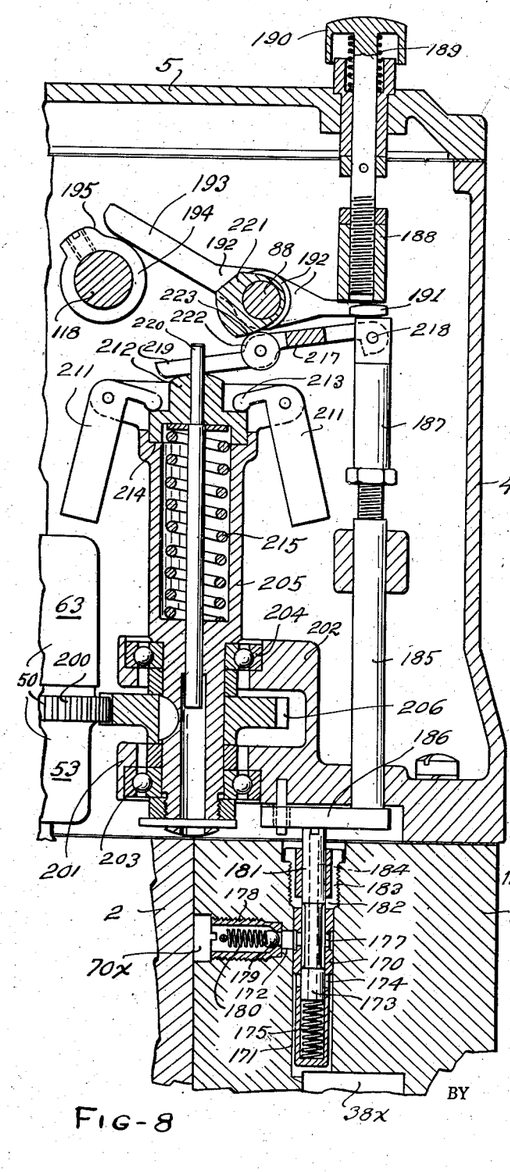
Fig. 8 is a sectional view taken at 8—8 on Fig. 2 showing a hydraulic shutdown device and B. M. E. P. control mechanism.
Figure 9:
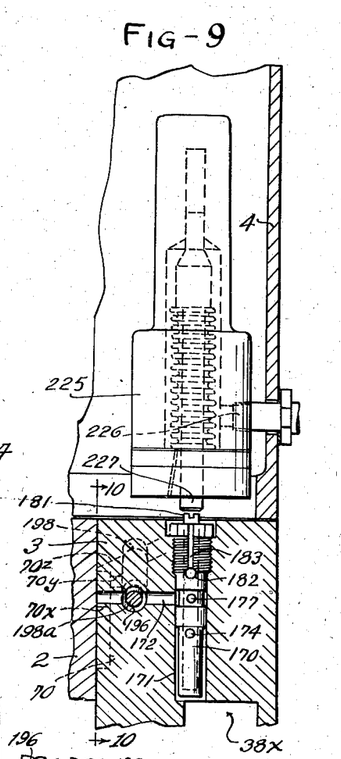
Fig. 9 is a view similar to Fig. 8, showing a device for effecting shutdown of an engine by remote control means.

Figs. 8 and 9 show a valve sleeve 170 in a vertical bore 171 of the servo-motor block 3, which bore communicates at its lower end with a constant pressure source, for instance a portion 38x of the space above the servo-motor piston portion 37. Another bore 172 leads horizontally from a point intermediate of the ends of the bore 171 and communicates with a part of the compensation fluid duct 70, as at the portion 7x thereof, Fig. 1, in the servo-motor block. The sleeve 170 may be threaded into the block near the top thereof, as shown, and is closed at its lower end and has a sliding valve plug 173 therein which normally blocks a series of lateral openings or ports 174 in the sleeve located at a reduced portion of the sleeve and made thereby to communicate freely with the constant pressure source 38x. A spring 175, seated on the closed lower end of the sleeve, normally presses the plug upwardly in closing relation to the ports 174. Above the plane of the ports 174 the plug 173 has a reduced neck 176 so as to provide a space around the plug communicating through sleeve ports 177 with the lateral bore 172 leading to the compensation fluid duct. As shown in Fig. 8 a valve sleeve 178 with check valve plug 179 therein is screwed into the horizontal bore 172 in a manner to provide a one-way outlet viz: from the ports 177 into the compensation duct. The plug 179 is held onto a suitable seat therefor in the valve sleeve by a spring 180.

The upper end or stem portion 181 of the plug 173, in the position of the latter which opens the ports 174, acts as a valve plug to close a series of ports 182 of the sleeve 170 which communicate with a sump space of the speeder case through longitudinal grooves 183 in the upper threaded portion of the sleeve 170. Thereby the fluid from 38x is diverted to 70x when the plug 173 is depressed to open the ports 174. With the plug 173 in its normal or closed position (sealing the ports 174) any leakage of high pressure fluid upwardly past the plug 173 will be vented freely to the sump and will not tend to unseat the check valve ball 179 and pass into the compensation fluid duct. The pocket between the lower end of the plug 173 and the sleeve 170 is vented to sump through a bore 184 in the valve plug.

When the upper end of the plug 173 is depressed, high pressure fluid is admitted to the compensation duct and this causes the pilot valve 20 to be pressed upwardly as the receiving compensation piston spring 76 is compressed, thus immediately slowing down and, if continued, presently stopping the engine by cutting off its fuel supply.

Hand shut down

One means of utilizing the functions of the valve just described (170, 173 etc.) is illustrated at right of Fig. 8. A rod 185 is suitably mounted for vertical movement in the speeder case and the lower end of the rod has a lateral extension 186 thereon located over the top of the stem portion 181 of the valve plug 173. An upper axially adjustable portion 187 of the rod 185 is positioned to be depressed by the lower end of a plunger 188 slidably mounted in the speeder case cover 5. The plunger 188, as shown, lies over an arm 191 positioned between the plunger and rod portion 187; and the plunger operates the rod 185 by depressing the arm 191. The essential purpose of the arm 191 is described below. The plunger 188 is normally pressed upwardly by a spring 189 surrounding the plunger and located between an operating knob 190 of the plunger and the cover 5. When the operator holds down the knob for a few seconds the engine is thereby shut down.

Speeder-mechanism-operated shutdown

The arm 191 mentioned above is part of a lever 192 pivoted on the cross shaft 88 so as to turn relative to the shaft. The lever is shown only on Fig. 8 but it occupies the portion on the shaft 88 on which the reference numeral 88 appears on Fig. 2. An arm 193 of the lever 192 extends over a cam member 194 on the speed adjustment shaft 118 and having a steep cam surface 195 adapted to lift the arm 193. The cam member 194 is shown only on Fig. 8 but the construtcion will be clear therefrom.

In all turned positions of the speed adjustment shaft 118 except that which sets the governor for lowest speed the arm 193 of the lever 192 is not moved by the cam. However, in such low speed setting position, the arm 193 is raised, causing the arm 191 of the lever to depress the shutdown rod 185 and shut down the engine.

The mechanism just described is used principally on reversible engines in such service as to require reversing at critical times. In operation; when (e. g.) the speed adjusting arm 130 (Fig. 4) is moved clockwise substantilly to the limit of its movement in that direction on the quadrant bar 137 the cam surface 195 operates on the lever 192 to shut down the engine preparatory to re-starting the engine to running in reverse. As soon as the engine stops the speed adjusting arm is moved counterclockwise sufficiently to turn the cam surface 195 out of contact with the arm 193 of the lever 192, thereby enabling the governor to resume normal operation. When the engine has been re-started, the speed adjustment arm 130 is moved further counterclockwise to accelerate the engine and maintain the desired reverse drive speed. The cam member 194 can, if desired, be turned on the shaft 118, upon release of a suitable set screw, so as to render the cam inoperative to cause shutdown.

Brake mean effective pressure control

A known device for preventing damage from being done to an internal combustion engine as a result of overfeeding of fuel thereto in the event the engine commences to stall under heavy load, is a fly-ball mechanism etc. arranged somewhat as shown at the left of Fig. 8. The device, as known in the art, and as employed herein, operates to limit the maximum brake mean effective pressure (B. M. E. P.) which can be developed in the engine cylinders by varying, in accordance with engine speed, the maximum amoun of fuel which can be supplied to the engine; whereby, if the engine begins to labor heavily under the applied load, the fuel input will be cut down rather than increased as would ordinarily happen on a governed engine when added load reduces speed.

As herein adapted and arranged the special fly-ball mechanism operates, through hydraulically acting means, indirectly on the main pilot valve which initiates operation of the fuel regulating servo-motor, so that the operation of said pilot valve, during expected load change is in no way interfered with or made sluggish by reason of the employment of the special fly-ball mechanism. The main speed regulating governor mechanism and the B. M. E. P. control governor mechanism "float" independently of each other during load change and ordinarily the operation of neither has any influence on the other.

Referring further to Figs. 1, 2 and 8, the main flyball head member 53 has gear teeth formed thereon constituting a gear member 200. Within the speeder case and at one side of the ball-head (location indicated in Fig. 2) there is provided a straddle bearing mounting including speeder case portions 201 and 202 and suitable antifriction bearing assemblies 203 and 204 for an upright spindle and pinion assembly 205, 206. The pinion 206 is in constant mesh with the gear to effect over-driving of said pinion, as shown. The spindle element 205 constitutes a ball-head having at its upper end supporting ears 210 for a set of depending fly-balls 211. During normal operation of the governor mechanism the fly-balls 211 occupy the outward position shown in Fig. 8 in which position a thrust member 212 is forced downwardly by the fly-ball arms 213 against a shoulder 214 in the ball-head member 205. The downward movement of the thrust member is resisted by a spring 215 within the ball-head 205 arranged as will be obvious from the drawings.

Since it is desirable to effect B. M. E. P. control only when the servo-motor of the governor tends to operate to supply too much fuel at relatively low engine speed it is only necessary to have the B. M. E. P. control fly-ball mechanism operate to cause reduction of power input to the engine when the servo-motor piston is in its relatively raised or increased-input-regulating positions.

With the above in view, a lever 217 is pivotally attached as at 218 to the shutdown rod portion 187 near its upper end, and the free end of the lever rests on a rounded upper end of the thrust member 212, said free end being guided by parallel finger portions 219 of the lever which straddle an upstanding pin 220 extending through the thrust member. An adjustable fulcrum device 221 is mounted on the cross shaft 88 which is turned by the rack of the servo-motor tail-rod 161, so that the fulcrum device can engage a follower roller 222 on the lever 217 directly below the shaft 88. The fulcrum device 221 is so shaped that it serves as a fulcrum to allow the thrust member 212 of the special fly-ball mechanism 205, 211 etc. to depress the rod 185 gradually increasing distances in the upper range of movement of the servo-motor piston. This is by virtue of the surface 223 of the fulcrum device, which surface gradually departs from the center of the shaft 88 in a direction clockwise about the shaft as shown in Fig. 8.

In the position of the speed regulating servo-motor piston 22 on Fig. 1 the fulcrum device 221 is in about the position illustrated in Fig. 8. Therefore it will be seen that if the engine begins to stall, in said position of the servo-motor piston, and the special fly-balls consequently move toward the axis of the ball-head 205, the spring 215 in the ball-head lifts the free end of the lever 217 causing the pivoted end thereof to depress the shutdown rod 185 an amount determined by the position of surface 223 of the fulcrum device relative to the follower 222 of the lever. If on the other hand the servo-motor piston is in various lowered positions, as upon initial starting of the engine or when in position to supply only a relatively small amount of fuel to the engine, the inwardly swung position of the fly-balls 211 will be ineffective and will not cause the shutdown rod 185 to be depressed. The operation of the B. M. E. P. control mechanism ceases to operate to cause reduced power input if the engine, after commencing to stall, again picks up speed; for when that occurs the fly-balls 211 immediately resume an outwardly swung position.

Although the B. M. E. P. control mechanism, the hand shut-down device 188—190 and the speeder-mechanism-actuated shutdown cam and lever 195, 192 operate on the same control rod (185, 187) none interferes with the operation of the others as will be obvious from Fig. 8.

*Automatic emergency stop (modification)*

Figure 10:
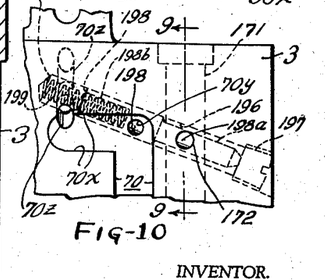
Fig. 10 is a detail view showing part of a modified shut down valve arrangement.
Figure 11:
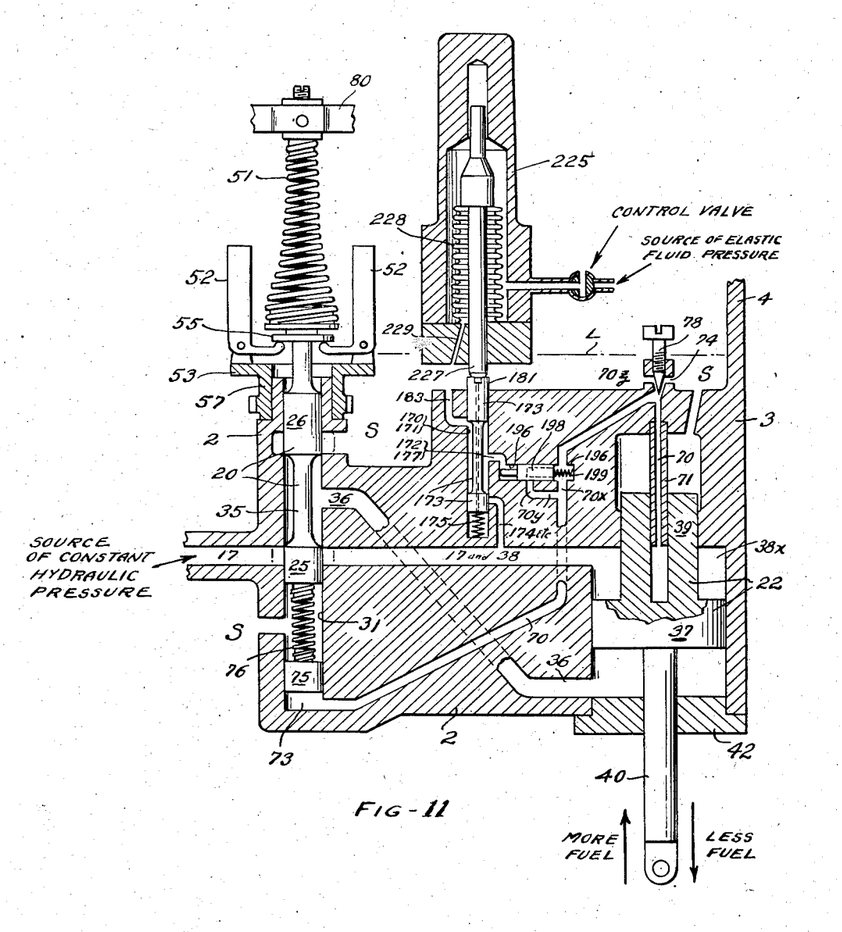
Fig. 11 is a diagram showing the governor and certain of the improvements claimed herein.

Figs. 9 and 11 show a pneumatically controlled device operable for instance as a "dead man stop" on Diesel driven railway equipment. The hydraulic shutdown valve 170—184 etc. may be arranged substantially as shown in Fig. 8 but, preferably, for all types of service, a modified shutdown valve mechanism according to Figs. 9 and 10 is used for reason explained below.

225 (Figs. 9 and 11) indicates an elastic fluid operated motor which may be mounted in the speeder case over the stem 181 of the valve plug 173 and supplied (e. g.) with compressed air as through a fitting 226 in a manner to thrust downwardly on a pin 227 whenever air under predetermined minimum pressure is applied at the fitting. A metal bellows 228 is contained in the housing of the elastic fluid operated motor, the upper end of the bellows being suitably sealed to the pin 227 and the lower end to said housing. A vent for the bellows is shown at 229 leading to a negligible pressure area, e. g. sump S. Air under substantial pressure, when admitted to the space around the bellows, tends to collapse the bellows endwise thereof and thrust downwardly on the pin 227. Such motor can be arranged to operate on from 25 to 300# per sq. in. pressure and serve for example to shut down the power plant when the engineer of a Diesel driven train releases an emergency lever which, so long as he is in full control, he holds in depressed position.

Any other remotely controllable means for operating the shutdown valve 173 etc. can be used instead, for instance a solenoid.

*Modified shut down valve*

The modified valve arrangement, mentioned above for controlling admission of high pressure fluid to the compensation fluid duct 70 is shown in Figs. 9 and 10, and diagrammatically shown in Fig. 11. For illustrative purposes the locations and proportions of some of the parts in Figs. 9 and 10 are slightly different from those employed in actual installations. Fig. 10 is in larger scale than Fig. 9.

The pressure admitted to the compensation fluid duct as at 70x through the valve mechanism 170–184 (Fig. 8) is over 100# per sq. in. and this is ordinarily more than adequate to cause a full shutdown because, when operating fluid is dumped from the space below the servo-motor piston portion 37, consequent upon raising of the pilot valve plunger 20, the servo-motor has many times more than the required downward thrust on the control rod 40. It is possible, however, to operate the governor with the secondary compensation adjustment needle valve 78 (right, Fig. 1) sufficiently open so that, when the shutdown valve plunger 173 is depressed, the rate of discharge of high pressure fluid to the compensation fluid duct is inadequate to offset the leak at the needle valve. The arrangement according to Figs. 9, 10 and 11 enables the portion of the compensation fluid duct adjacent the needle valve to be closed during the operation of the shutdown valve mechanism.

In Figs. 9 and 10, the horizontal bore 172, to which high pressure fluid is admitted when the valve plug 173 is depressed, communicates with a cylindrical valve bore 196 in the servo-motor block 3. The bore 196 extends from the bore 172 past a short passage 70y, forming a branch of the compensation fluid duct portion 70x into crossing relationship to a diagonal bore 70z. The bore 70z leads from the duct portion 70x to the fitting in which the secondary compensation needle valve 78 operates (see Fig. 1). The end of the bore 196 opposite the end portion thereof which crosses the bore 70z is closed by a threaded plug 197. Slidably fitting the valve bore 196 is a valve plunger 198 having a reduced diameter portion 198a at one end, normally held against the threaded plug 197 by a spring 199. The spring lies partly in an axial deadended bore 198b of the valve plunger and extends out of said plunger bore and bears against the end of the valve bore 196 lying opposite the threaded plug. The portion of the valve plunger 198 which fits the valve bore 196 normally closes the short branch passage 70y from comunicating the duct portion 70x with the valve bore 196. Also, normally, the end of the valve plunger which contains the spring does not block the diagonal bore 70z of the compensation fluid duct.

When the shutdown valve plug 173 is depressed, the high pressure fluid from the space 38x enters the valve bore 196 through 172 and moves the valve plunger 198 to the left (Fig. 10) until the left hand end of the plunger abuts the adjacent end of the valve bore. This opens the passage 70y to allow the high pressure fluid to pass through the duct 70 to the space 73 below the pilot valve 20, 21; but the fluid so admitted to the compensation fluid duct is blocked by the valve plunger 198 from backing up in the bore 70z where it could otherwise be bled off at the needle valve. Thus so far as the shutdown operation is concerned the needle valve may be opened to any extent necessary, as determined by characteristics of the prime mover to be governed; but, irrespective of the amount the needle valve is opened, the leak-off cannot interfere with the operation of the shutdown valve mechanism.

The diagram Fig. 11 differs from the showing according to Figs. 9 and 10 mainly in that, for illustrative purposes:—the pilot valve sleeve 21 is omitted; the valve body 170 (in which the shut-down-control valve plunger 173 slides) is omitted; the hydraulically actuated valve plunger 198 slides to the right (instead of the left as in Fig. 10) in opening the passage 70y to a high pressure source and closing communication between the compensation fluid duct portions 70x and 70z; and the principal portions of all the various fluid ducts and passages are shown in the plane of the drawings. The passage indicated "174 etc." on Fig. 11 represents the lateral ports 174 in the sleeve 170 and that portion of the bore 171 of Figs. 8 and 9 which intercepts the servo-motor cylinder space 38x above the servo-motor piston portion 37. The pressure in passages 17 and 38 is, however, the same as that in said space 38x. The spring 199 which normally holds the hydraulically actuated valve plunger 198 positioned to unblock the compensation fluid duct 70 is made strong enough so that the plunger 198 does not move during the compensating action of the mechanism, that is when the lowering movement of the servo-motor piston 22 causes, or tends to cause a lowering movement of the actuated compensation piston 75.

BOOSTER SERVO

Shown at the left in Fig. 3 and located at the left in Fig. 2 is a cylinder block portion 240 of the speeder case portion which contains the power head 90 etc. previously described. Fig. 1, at the left, also shows part of the duct system associated with the mechanism about to be described. The booster-servo is for enabling air pressure from the starting air line of a Diesel engine to be used to insure the building up of adequate pressure and supply of operating fluid in the governor.

As shown in Fig. 3 the block portion 240 of the speeder case (hereinafter for convenience: block 240) is bored upwardly from the bottom at 241 to a point near the top to receive a piston 242 having an imperforate partition 243 between its ends, a downwardly projecting hollow cylinder portion 244 below the partition and an upwardly projecting hollow cylinder portion 245 above the partition. The piston 242 is normally forced downwardly, by a strong spring 246 in the upper part of the cylinder bore 241, against a plug-like member 247 fixed to the block 240 and which nearly closes the lower end of the cylinder bore. The member 247 has an axial bore 250 leading therethrough and having an enlarged entrance portion threaded to receive an air pipe connector fitting (not shown) of the starting air line. Pressure in such lines is usually several hundred pounds. An upper cylindrical portion 251 of the plug-like member 247 constitutes a fixed piston mating with the lower cylinder portion 244 of the piston 242. A cup shaped flexible sealing element 252 is secured to the fixed piston 247, so that air admitted through the bore 250 thereof will raise the hollow piston 242, compressing the spring 246.

Assuming the upper part of the cylinder bore 241 contains hydraulic fluid, the air line pressure will force such fluid out of the upper end of the block 240 through a duct 253 formed by intercepting bores in the top wall of the block 240 as clearly shown. The duct 253 (cf. Figs. 1, 2 and 3) leads to the constant pressure space 17 etc. of the hydraulic system of the governor as through a vertical bore 254 (see Fig. 1) and check valve chamber 255, part of bore 102, which latter communicates with the duct comprised of bores 100 and 101 (Fig. 1) already described. The check valve chamber 255 has a spring pressed ball 257 therein operative to prevent loss of pressure from the constant pressure chambers (17 etc., including power head cylinder 92) of the governor after starting has been accomplished.

The booster-servo obtains hydraulic fluid from the speeder case portion of the sump through a duct comprising interconnected bores in the speeder case: 260, 261, 262 and 263 (Fig. 2 particularly) past a gravity seated ball check 264 (Fig. 1) in the bore 262. The bore 263 intercepts the discharge duct 253 in the top of the booster cylinder block. The ball check 264 prevents return flow of fluid to the sump from the booster cylinder when the booster-servo piston is raised in starting.

In the event the governor stands idle for some time the pressure accumulators will ordinarily force most of the fluid out of the constant pressure spaces into the sump. In such event subsequent operation of the booster-servo piston would be resisted only by the unloaded or nearly unloaded accumulator springs. Also if fluid happened to be low in the speeder case portion of the sump at the time the booster-servo piston 242 previously descended to draw a new supply of fluid from that portion of the sump and the sump supply failed to supply fluid there would be nothing but air in the upper part of the cylinder 241 to damp the upward movement of the booster servo-piston on the next actuation. In either event damage to the upper booster-servo cylinder head portions can be prevented by the present arrangement (Fig. 3), viz:

The upper cylinder portion 245 of the booster-servo piston slidably receives a dash pot plunger 265 having a small hole 266 extending therethrough to a downwardly open counterbore 267 of the plunger. A compression spring 268 resting on the partition 243 extends into the counterbore 267 and operates, whenever necessary, to draw fluid into the chamber below the plunger through the hole 266 until the spring has become fully expanded. The hole 266 of the plunger is aligned with the vertical portion of the duct 253 so that the hole 266 cannot be sealed by engagement of the plunger with the top of the cylinder bore 241. In the fully expanded position of the spring the plunger stands a short distance above the top rim of the upper cylinder portion 245 of the booster-servo piston. Thus when air is applied to raise the booster-servo piston and the piston encounters little or no resistance except that afforded by the spring 246 the impact of the booster-servo piston is cushioned by discharge of hydraulic fluid from the dash pot.

To prevent oil from entering the air starter line where it might cause an explosion if allowed to be carried into the engine along with the starting air, a vent hole is provided at 270 in the member 251 which serves as the fixed air piston. The illustrated position of the vent also prevents air which may leak past the sealing cup 252 from entering the hydraulic fluid of the governor along the outside of the hollow piston 242.

Starting air admitted to the chamber between the fixed and movable pistons 241 and 242 can be bled out of said chamber at a ball check valve 272, Fig. 3, having a ball 273 which moves outwardly against a seat 274 in a sleeve 275 (overcoming the force of the ball spring 276) when air is applied to the line and which is pushed away from the seat by the spring when the air pressure finally drops say to around 75# per sq. in.

CUSHION START

For preventing radical overshooting of speed beyond the desired normal running speed at the start of operation of the engine (partly explained in object No. 4, under "a" and "b") there is provided, Fig. 1, a servo-motor 280 between the upper end of the pilot valve plunger 20 and the speeder spring 51. This servo-motor can be supplied with hydraulic fluid partly through an axial bore of the pilot valve plunger which, as shown in my patent identified above, supplies oil for lubrication of the ball-head bearing. This is the principal reason for locating the "cushion start" servo-motor at the top of the pilot valve plunger. Otherwise it could just as well be above the speeder spring. It can, incidentally, be used as an interponent between any of the connected parts of speed adjustment mechanism, as between the power head piston and lever 80.

As shown in Fig. 1 a servo-motor cylinder 281 is made rigid with the pilot valve plunger 20 and ball-arm finger thrust member 55 thereof, and the lower speeder spring retainer or perch 282 carries a piston 283 fitted to the cylinder. The pilot valve plunger 20 is centrally bored at 284 from its lower end (lower end of bore suitably plugged), and the bore extends upwardly past the groove 27 of the land 25 of the plunger and communicates with the groove by reason of cross holes 285. The groove 27 being opposite the constant pressure ports 28 of the pilot valve sleeve, during normal running speed of the engine, is normally continuously supplied with hydraulic fluid under substantial pressure. Part of the fluid so supplied to the axial bore 284 is taken from said bore at an upper groove 286 through radial holes in the plunger communicating with the bore and the latter groove. Fluid so supplied to the wall of the valve sleeve 21 travels upwardly and downwardly from the groove 286 in the clearance space (e. g. .002") between the plunger and sleeve. The downwardly traveling fluid is used for lubrication somewhat the same as in said patent through the intermediary of a reservoir groove 287. The fluid which travels upwardly along the outer surface of the valve plunger is intercepted by a reservoir groove 290 and returned to a center bore 291 leading downwardly from inside the working chamber of the servo-motor 280 into communication with the groove 290 through radial holes 292.

At the start of the operation of the governor the piston and cylinder chamber of the servo-motor 280 is practically empty, fluid having been squeezed out of the chamber by the force of the speeder spring. This allows the spring to become extended so that it has initially less force to oppose outward movement of the fly-balls than it has to have during normal operation. Thus with the spring, in effect, slacked off at the start the fly-balls quickly attain their normal operating position and begin to check the speed of the engine before it has attained full speed. But since raising of the pilot valve plunger places the groove 27 in communication with constant pressure fluid in the hydraulic system, as evident from Fig. 1, the servo-motor 280 becomes rapidly filled with operating fluid and the effective force of the speeder spring is then increased to normal for the particular set speed.

The working clearance of the valve plunger and sleeve between the grooves 286 and 290 of the plunger can be such as to regulate the supply of fluid to the servo-motor 280 so that the servo-motor becomes filled just as the engine attains normal running speed; or suitable means for adjustably metering fluid to the servo-motor can be used (e. g. needle valve, not shown).

To limit the capacity of the working chamber of the servo-motor 280 so that the speeder spring is always compressed the same amount by the servo-motor, leak off vents may be provided in the wall of the servo-motor cylinder, as at 295. Alternatively, coacting shoulders (not shown) can be formed on the piston and cylinder definitely to limit upward movement of the lower speeder spring retainer relative to the pilot valve plunger.

During normal operation the piston and cylinder surfaces of the servo-motor 280 turn relative

COLD START; LOAD DELAY

A cold Diesel engine often does not start readily with the throttle fully open. Starting is easier with the throttle partly (e. g. half) open. Load as of a generator should be prevented from being applied to the engine until such time as the engine has attained substantially normal running speed.

Referring to Fig. 1: upon starting, the first operation of the pilot valve 20, 21 is to admit fluid to the under side of the input-regulating servo-motor piston portion 37, tending to cause the servo-motor piston to rise to the full limit of its stroke. This upward travel is normally arrested only when the fly-ball weights move to the vertical position in which shown or outwardly therefrom to correct over-regulation. Until nearly normal speed is attained and the accumulators are charged, there is very little pressure at either side of the servo-motor piston portion 37. However there is enough to move the servo-motor piston to full throttle position unless there is some means for checking that movement.

As shown at the right (Fig. 1) I provide a spring-stressed servo-motor latch comprising a piston 300 in a cylinder block 301 attached to one side of the main servo-motor block. The central bore 302 of the cylinder block 301 is open to a working pressure space of the hydraulic system, as by reason of a duct 303. The piston 300 has a relatively reduced portion 304 extending into the main servo-motor cylinder at such position that it can serve as a latch or abutment for engaging the regulating servo-motor piston portion 37, say half way to the upper limit of its full stroke. A spring 305 between the outer end of the cylinder bore 302 and the piston 300 has sufficient force to overcome the initial pressure in the hydraulic system tending to push the piston 300 outwardly to withdraw the latch pin from the main servo-motor cylinder. The outer or dead end of the cylinder bore 302 is vented to sump as by a duct 307, and the piston 300 and cylinder bore 302 may have surfaces at 308 and 309 respectively, capable of forming a tightly sealed valve when the piston is moved hydraulically to latch release position.

As long as the regulating servo-motor piston portion 37 is held against the latch pin 304, as the engine picks up speed, the friction of said piston portion on the latch pin prevents pressure at the upper side of the servo-motor piston portion 37 from acting on the piston 300 to withdraw the latch; but when the fly-ball mechanism finally centers the pilot valve plunger a slight overtravel of the latter releases fluid from the lower side of the servo-motor piston and the friction force on the latch pin 304 is temporarily released. Thereupon the piston 300 is driven hydraulically to its full latch-releasing position where it remains during subsequent operation of the governor.

Since the piston 300 remains in the position in which shown until the engine has attained speed and then moves outwardly and remains there, the piston can be utilized to operate a switch such as indicated at 311 which, when closed, energizes the circuit breaker closing coil 315 of a generator driven by such engine. Similarly normally closed contacts (not shown) can be operated by the piston 300, during acceleration of the engine to force energization of exciter coils of an A. C. generator, and, afterward, to cease forcing said coils. A closure member 312 of the switch 311 is shown as carried on a stem 313 extending out of the block 301 and connected to the piston 300 for outward movement thereby as the engine attains running speed. The valve provided by the surfaces 308 and 309 of the latch-operating piston 300 and the block 301 prevents leakage of hydraulic fluid out of the block along the stem 313 during operation of the governor.

The above described functions of the device 300—315 can be used independently of each other. Irrespective of the type of prime mover governed, the pilot valve and main servo-motor would cooperate as described to release and position the latch device to withdrawn position; hence in any case the functions of performing operations on a generator, as in preventing application of substantial load on the prime mover until normal or nearly normal speed is reached or controlling excited coils are desirable. Initial checking of the servo-motor at a position short of its full stroke reduces vacillation in speed at the beginning of prime mover operation, irrespective of the type of prime mover governed.

ACCESS TO SPEEDER CASE

Usually access to the speeder case is by means of a cover which is fixed to the case by screws. In such construction there is a special filler opening for hydraulic fluid but the opening does not enable general inspection of the mechanism inside the case or access for making adjustments or cleaning out deposits of foreign matter which may accumulate in the case. In the present construction the entire cover 5 can be removed quickly without the use of tools and just as easily replaced and securely fastened in sealing relation to the case.

As shown in Figs. 1 and 3 the speeder case cover 5 carries, nearly centrally thereof, a fairly large knurled knob 320 having a circular stem 321 rigid therewith and projecting downwardly therefrom and mounted for rotation in the upper wall of the cover. Below the circular part of the stem is a non-circular portion 322 (e. g. square) extending a short distance below the under side of the cover. Below the square portion the stem has a reduced screw-threaded portion 323 shown as extending in threaded engagement with a boss at the mid-portion of a substantially rigid horizontal locking bar 324. The locking bar, in the position in which shown (see Fig. 3) has its two ends extending downwardly to form tongues 325 adapted to underhang inwardly extending ribs 327 on respective opposite side walls of the speeder case at the upper inner margins of said walls. The locking bar is of sufficiently less strength than the inner width of the case so that the bar can be turned about the axis of the stem 321, the ends of the bar being rounded to clear the side walls. A stop for limiting the swinging movement of the locking bar depends from the cover at 328. The locking bar can be turned against the stop to a position approximately parallel with the side wall ribs 327.

A bowed leaf spring 330 extends across the locking bar, said spring bearing upwardly at its ends on the cover and downwardly on the bar intermediately of said ends. The spring has a round hole through which the square portion of the stem 321 extends to hold the spring in position. A metal disc 331 having a square hole embracing the square portion of the stem 321 lies between the spring 330 and the locking bar. A shoulder for preventing the threaded portion of the stem from being turned until it is unscrewed from the locking bar may comprise a cotter pin 333 which, in the locking position of the bar, is some distance below the underside of the bar.

The locking bar, in the cover securing position thereof (as shown) can be caused to bear upwardly on the ribs 327 with sufficient force to hold all marginal edges of the cover tight against the upper edge surfaces of the speeder case. Dowels 335 in the cover align the cover with the speeder case at holes provided to register with the dowels.

To release the locking bar (assuming a point of view above the cover) one turns the knob to the left until the tongues 325 no longer clamp against the ribs 327. Then the bar can be turned freely to the left against the stop 328 since the spring 330 maintains pressure on the disc 331 on the square portion of the stem, and the disc frictionally drives the locking bar with the rotating stem 321. The cover can then be lifted off the case.

In returning the locking bar to locking position after replacement of the cover, rotation of the knob to the right turns the bar to the right until it engages a different surface of the stop 328 whereupon it is in the locking position in which illustrated. Further turning of the knob then draws down the cover.

Certain of the features shown herein are claimed in the following divisional or continuation applications: Serial No. 403,805, filed July 24, 1941; Serial Nos. 410,283 and 410,284 filed Sept. 10, 1941.

Reference is also directed to my copending application Serial No. 396,338 filed June 2, 1941, to which certain claims were transferred from this application.

I claim:

1. In a governor mechanism, a hydraulic regulating relay including a regulating servo-motor, a pilot valve actuatable in opposite directions from a normal position for controlling application of hydraulic pressure to the servo-motor and weighing means operatively connected to the pilot valve, a fluid operated compensation system operatively connected to the pilot valve in a manner tending to restore the pilot valve to normal position upon each movement of said pilot valve out of normal position; and means including a normally closed valve arranged to subject said system to fluid pressure from a source outside said system whereby to cause an actuation of the pilot valve in one direction independently of the action of the weighing means thereon.

2. Governor mechanism according to claim 1 wherein the compensation system includes a secondary compensation outlet and inlet vent in the compensation system, said governor mechanism including means rendered operative by said normally closed valve, when the latter is moved to open position, to render the bleeder temporarily inoperative to bleed fluid from part of said system.

3. In a governor a hydraulic servo-motor adapted to regulate a machine or apparatus to be governed, pilot valve means operable to control admission and release of hydraulic fluid from a relatively high pressure source in respect to the servo-motor, weighing means normally controlling the operation of the pilot valve means, hydraulically operable compensation means acting through hydraulic fluid at relatively low pressure on the pilot valve means through a compensation fluid duct as a function of servo-motor travel to prevent overregulation at each change imposed on the weighing element by operation of such mechanism or apparatus, means forming a passage connecting the high pressure source to the compensation fluid duct, normally closed valve means blocking the passage, and means to operate the valve means to open the passage whereby to enable high pressure fluid to counteract one operation of the weighing means on the pilot valve means.

4. In a governor, the combination with a high pressure source of hydraulic fluid, a hydraulic servo-motor, a weighing element, a sliding pilot valve member actuated by the weighing element to control the admission of hydraulic fluid from said source to the servo-motor, and compensating means including a duct in which hydraulic fluid is moved consequent upon movement of the servo-motor in a manner tending to restore the pilot valve member to normal position upon each movement of said pilot valve member out of normal position, of means to operate the pilot valve member in one direction independently of the operation of the weighing element, said last named means including a second duct connected to said high pressure source and to the compensation fluid duct and valve means normally blocking the second duct and operable to unblock the same.

5. In a governor the combination with a hydraulic servo-motor adapted to regulate power input to a prime mover, pilot valve means operable to control the servo-motor, speed weighing means normally controlling the operation of the pilot valve means, and speed setting means operable on the weighing means; of normally inactive hydraulic means operable on the pilot valve means to cause the same to operate the servo-motor independently of the speed weighing means in an input-decreasing direction, and means operatively connecting the speed setting means and normally inactive means and operative to render the latter active upon a predetermined speed reducing movement of the speed setting means.

ALBERT KALIN.